United States Patent
Vanneste et al.

(10) Patent No.: US 10,357,053 B2
(45) Date of Patent: Jul. 23, 2019

(54) APPARATUS FOR PREPARING A MOULDED FOOD PRODUCT

(71) Applicant: Dart Industries Inc., Orlando, FL (US)

(72) Inventors: Michiel G. H. P. E. Vanneste, Aalst (BE); Thomas A. De Rycke, Ghent (BE)

(73) Assignee: Dart Industries Inc., Orlando, FL (US)

( * ) Notice: Subject to any disclaimer, the term of this patent is extended or adjusted under 35 U.S.C. 154(b) by 160 days.

(21) Appl. No.: 15/651,423

(22) Filed: Jul. 17, 2017

(65) Prior Publication Data

US 2019/0014811 A1    Jan. 17, 2019

(51) Int. Cl.

| A23P 30/10 | (2016.01) |
| A23P 20/25 | (2016.01) |
| A47J 43/20 | (2006.01) |
| A23L 7/126 | (2016.01) |
| A23L 19/12 | (2016.01) |

(52) U.S. Cl.
CPC .............. *A23P 30/10* (2016.08); *A23L 7/126* (2016.08); *A23L 19/135* (2016.08); *A23P 20/25* (2016.08); *A47J 43/20* (2013.01)

(58) Field of Classification Search
CPC ............ A23P 30/10; A23P 20/25; A47J 43/20
USPC .................. 249/102, 155; 425/183, 318
See application file for complete search history.

(56) References Cited

U.S. PATENT DOCUMENTS

| 2,722,713 | A | * | 11/1955 | Oestermeyer | A22C 7/0076 |
| | | | | | 249/102 |
| 3,700,204 | A | * | 10/1972 | Swett | A47J 43/20 |
| | | | | | 249/104 |
| 3,834,437 | A | * | 9/1974 | Swett | A23G 9/221 |
| | | | | | 249/139 |
| 4,437,826 | A | | 3/1984 | Tezuka | |
| 8,038,118 | B1 | | 10/2011 | Ajakie | |
| D828,120 | S | * | 9/2018 | Byeon | D7/672 |
| 2010/0107900 | A1 | | 5/2010 | Hanson | |
| 2015/0296866 | A1 | | 10/2015 | Mele | |

OTHER PUBLICATIONS

Arancinotto Slim (Pointed) 160g; Amazon.com; Jan. 17, 2017.

* cited by examiner

*Primary Examiner* — Robert B Davis
(74) *Attorney, Agent, or Firm* — Taylor J. Ross

(57) ABSTRACT

An apparatus for preparing a moulded food product, the apparatus comprising a base having first and second ends, with differing first and second moulds being formed with the first and second end respectively. A ring is engageable with either end of the base and has a ring mould portion contiguous with the first and second moulds to create a forming space when in use. A central aperture extends through the ring mould portion and a plunger is dimensioned and configured to pass through the central aperture, the plunger having a forming end and a closing end.

7 Claims, 4 Drawing Sheets

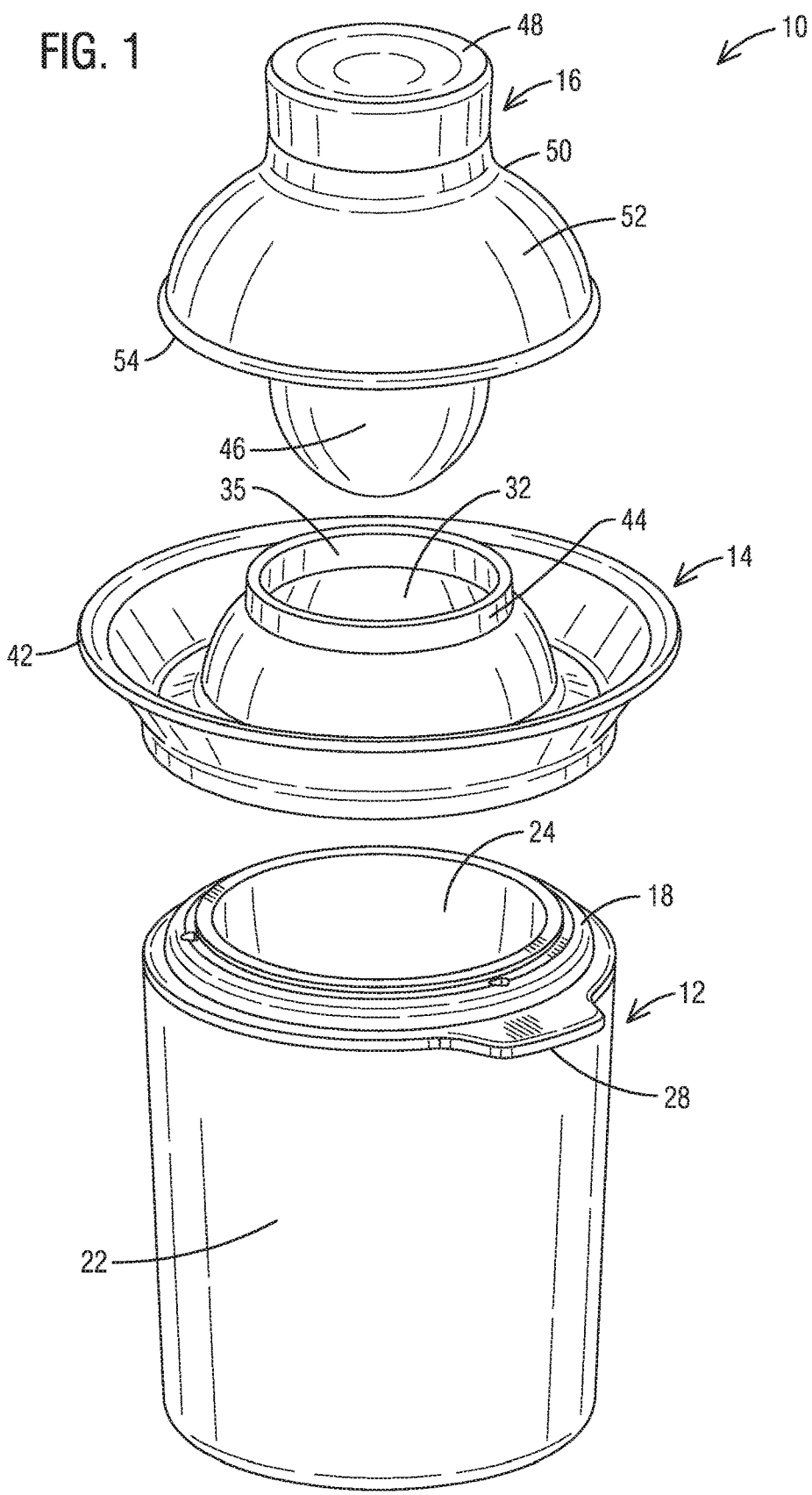

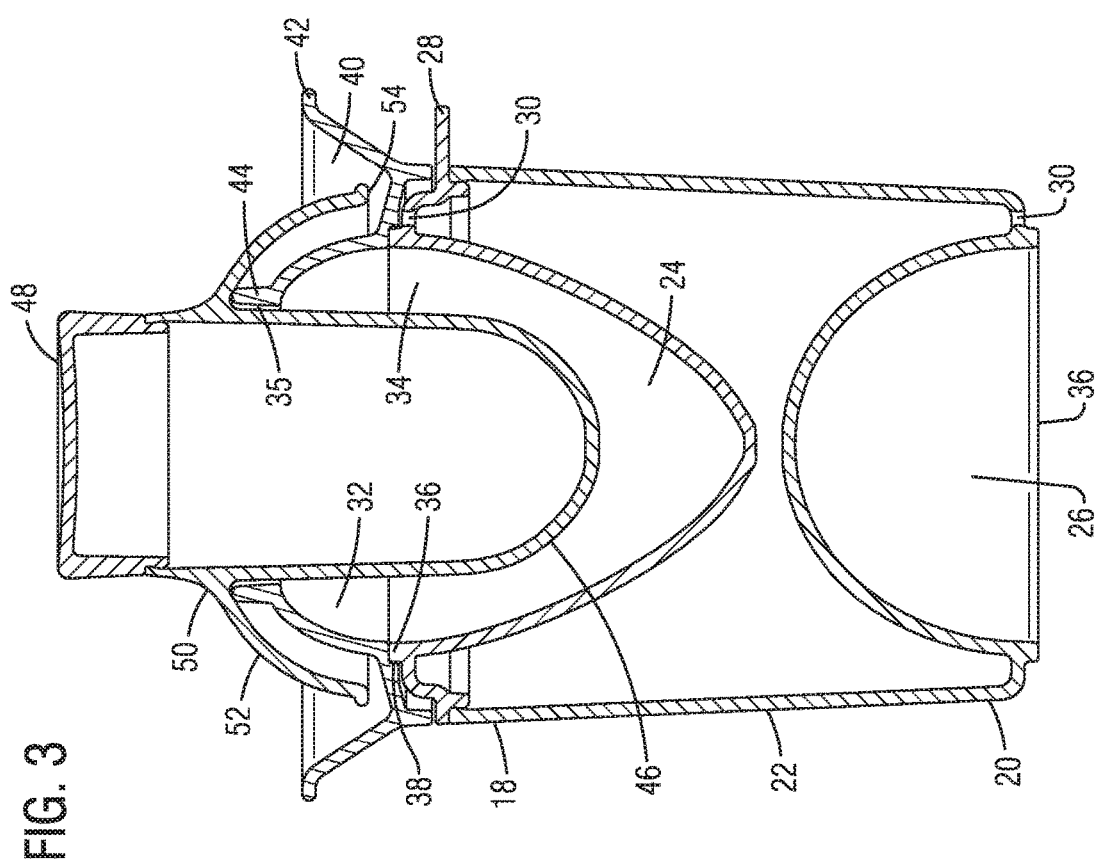
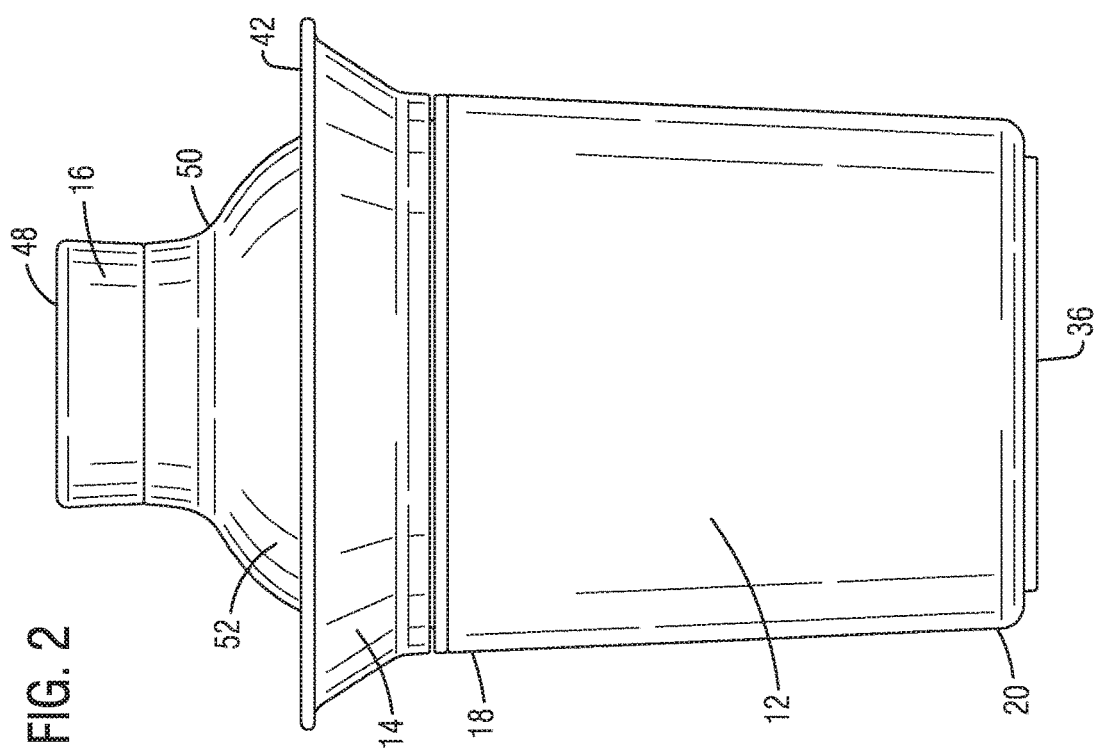

APPARATUS FOR PREPARING A MOULDED FOOD PRODUCT

CROSS REFERENCE TO RELATED APPLICATIONS

This application is related to co-pending Ser. No. 29/610,857, filed Jul. 17, 2017, which is incorporated by reference herein.

STATEMENT REGARDING FEDERALLY SPONSORED RESEARCH

Not applicable.

BACKGROUND OF THE INVENTION

The present invention relates in general to an apparatus which allows the user to prepare a food product moulded from cooked rice, cooked potato and the like such as potato croquettes and especially arancini (singular: arancino).

Arancini originate in Italy and are balls of rice stuffed with a filling which are then coated with breadcrumbs and then fried or baked. The filling of arancini may be, for example a meat sauce, cheese such as mozzarella and/or vegetables. Arancini are made from rice which has already been cooked, in particular risotto rice. They may have a spherical shape or a more conical or bullet-like shape.

SUMMARY OF THE INVENTION

An object of the present invention is to provide an apparatus for preparing a molded food product which includes two differing moulds to produce two different shapes or sizes.

Another object of the present invention is to provide an apparatus for preparing a molded food product which reduces the mess associated with food extrusion during use.

A further object of the present invention is to provide an apparatus for preparing a molded food product which reduces the need to manually grasp a plunger soiled with food, and thereby potentially soil the food as well.

These and other objects are achieved by an apparatus for preparing a molded food product. It is to be appreciated that the invention described below is not limited to devices for forming arancini. The apparatus of the invention is capable of preparing many kinds of moulded food products which may or may not be stuffed with other ingredients. For example, the device of the invention can also prepare a potato croquette by moulding cooked and mashed potato. The croquette may or may not be filled, for example with melting cheese. Additionally, the apparatus of the invention is operable with other types of mouldable foodstuffs such as polenta, dough, *quinoa*, bulgur wheat and ebly. The foodstuff could also be a ground or minced meat filled with sauce, cheese, and/or vegetables or fruit.

While arancini have traditionally been made by hand, by forming a rice ball and inserting a filling before covering with breadcrumbs and frying or baking, other devices are known in the art for assisting the cook with preparing moulded food products. For example, U.S. Pat. No. 8,038,118 B1 discloses a mould for making stuffed or filled food products. Additionally WO 2014/080335 discloses a mould for making stuffed or filled food products and in particular Sicilian arancini (which is the bulled-shaped type). The device includes a base having at one end a mould, a mounting ring and a plunger element. However, this device suffers from drawbacks, in particular because it can only produce a single kind of arancini, having a bullet shape. The present invention seeks to overcome this problem as well as other problems experienced in the prior art devices.

According to the present invention there is provided an apparatus for preparing a moulded food product, the apparatus comprising: a base having first and second ends, with differing first and second moulds being formed with the first and second end respectively; a ring engageable with either end of the base and having a ring mould portion contiguous with the first and second moulds when in use, a central aperture extending through the ring mould portion; and a plunger which is dimensioned and configured to pass through the central aperture, the plunger having a forming end and a closing end.

Preferably, the base is tapered such that the periphery of one of the ends is smaller than the other for easy visual reference as to which of the first or second moulds is uppermost and available for use.

Preferably, but not required, one of the first and second moulds is substantially half-hemispherical in cross-section and the other one of the first and second moulds is substantially a rounded cone or bullet shape in cross section, and preferably wherein the first mould is substantially round in cross-section and the second mould is substantially a rounded cone or bullet shape in cross section.

Preferably, the ring is transparent, partially transparent or translucent.

Conveniently, the first mould in combination with the ring mould portion and the second mould in combination with the ring mould portion each form a respective complete mould for the food product.

Preferably, the ring is provided with a circumferential flange extending outward and away from the base so as to form a trough which is upstanding when the ring is engaged with the base.

Preferably, the plunger also includes a circumferential flange, and wherein the flange faces downwards when the forming end of the plunger is passed through the aperture in the direction of the base.

Aspects of the invention will now be described in detail with reference to the accompanying drawings, in which:

BRIEF DESCRIPTION OF THE DRAWINGS

The objects and features of the invention noted above are explained in more detail with reference to the drawings, in which like reference numerals denote like elements, and in which:

FIG. 1 is a top perspective exploded view of the apparatus for preparing a molded food product according to the present invention in the operative configuration;

FIG. 2 is a side view thereof;

FIG. 3 is a cross-sectional view along line 2-2 of FIG. 2;

DETAILED DESCRIPTION OF THE INVENTION

Figure 4:
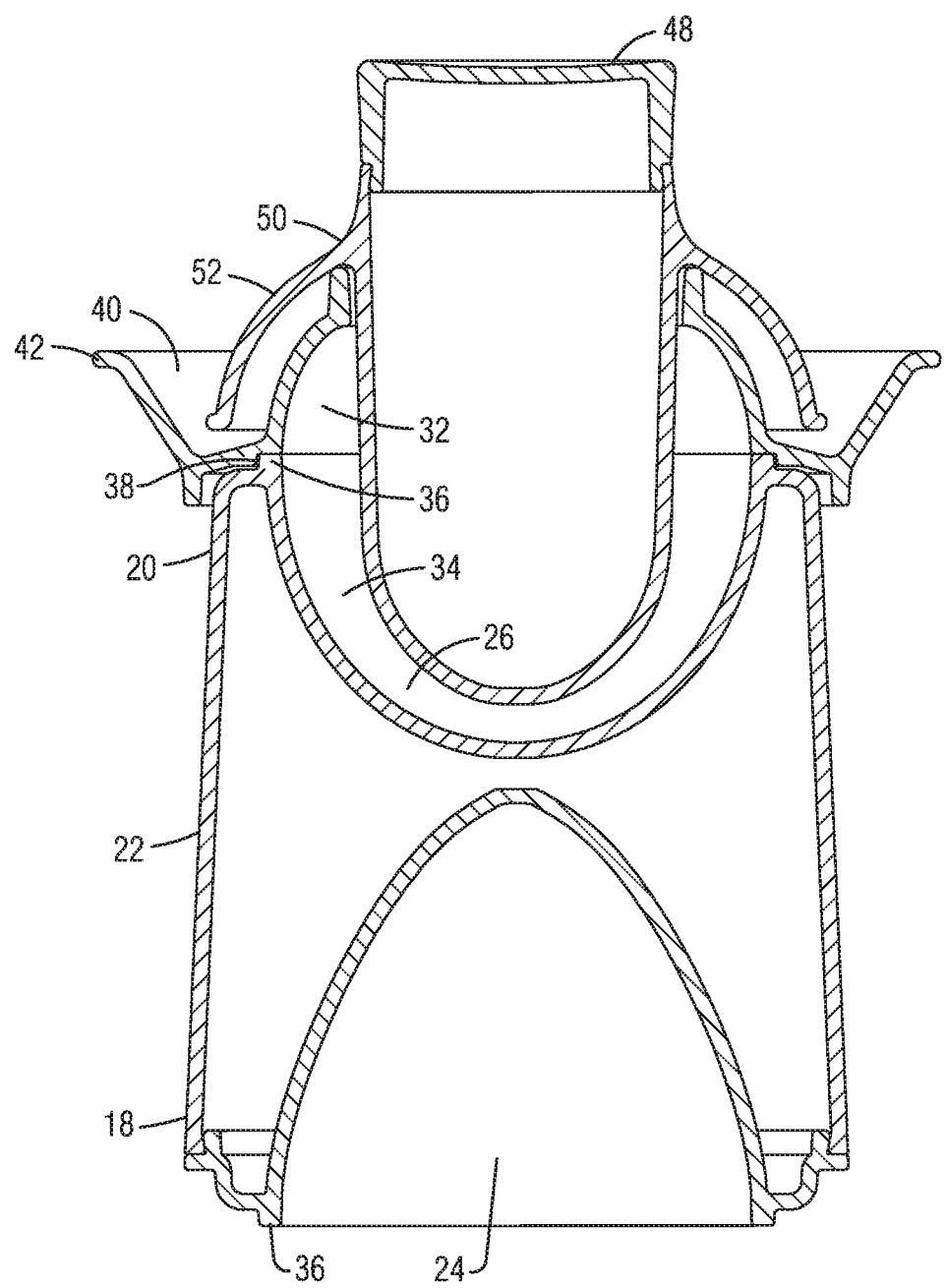
FIG. 4 is a similar cross-sectional view with the base reversed.

With reference to FIG. 1, an apparatus for preparing a molded food product according to the present invention is generally designated by reference numeral 10. The apparatus 10 generally includes a base 12, a ring 14 and a plunger 16. The base 12 includes first and second ends 18 and 20, respectively, which are connected by at least one sidewall 22. The base may be formed of various materials such as stone, metal, wood or plastic, and may be a monolithic piece or formed in pieces. An important part of the present invention is that a first mould 24 is formed in the first end 18, a second mould 26 is formed in the second end 20, and that the first and second moulds have differing shapes and/or sizes (volumes). This feature enables the user to make two different food products with a single apparatus. In the embodiment shown, the first mould 24 is generally bullet-shaped or conical, while the second mould 26 is a half hemisphere. Other shape combinations are of course possible.

While not required, it is preferred that the first and second ends 18 and 20 are differently sized such that the base 12 in general has a tapered shape. In the embodiment shown, both ends 18 and 20 are circular but having different diameters, such that there is a single sidewall 22 which forms the frustum of a cone. This same concept may be applied to various polygonal forms as well. In this way, it is visually apparent to the user which of the first or second ends is uppermost (and thus useable or in use) even with the ring 14 in place and obscuring visibility of the mould thereunder.

In the embodiment shown, the apparatus 10 is formed by injection moulding of plastic, and as such the base 12 cannot be formed as a single or monolithic unit. Rather, the sidewall 22 and second mould 26 are formed as a single injectable piece, and the first mould is formed as a second, separate injectable piece. As may be envisioned, the draft angle involved in the tapered base determines which mould is formed together with the sidewall. In this arrangement, there is the possibility of food being trapped at the join between these two pieces. As such, it may be advantageous to form this join as a simple press fit and to provide a tab 28 on the first cavity to assist removal of the associated mould. This separability would allow the two pieces to be placed in a dishwasher with both moulds 24 and 26 facing downward for best cleaning. Drainage holes 30 may be provided as well in each piece for aid in washing.

Each of the moulds 24 and 26 define a mouth opening onto the respective first and second ends 18 and 18. The ring 14 includes a ring cavity 32 having a concave shape opening downward to its own mouth and which will cooperate with the first and second moulds 24 and 26 to define a partially enclosed forming space 34 in which the food product will be formed. This is only partially enclosed, because the ring cavity 32 includes a central aperture 35 extending therethrough. "Central" in this context means that the aperture is provided at an axial location with respect to the ring 14.

The ring 14 may be freely placed upon either of the ends 18 or 20 of the base 12 to create the forming space 34, and the ring 14 may be freely removed from the base 12 to allow removal of the fully formed food product. To ensure proper forming of the food product, it is preferred that there be a close fit between the mouth of the ring cavity 32 and the mouths of each of the first and second mould 24 and 26 have a close connecting arrangement. In the embodiment shown, each of the moulds 24 and 26 open to a ridge 36 extending about the entire periphery, and the ring cavity 32 opens onto a mating notch 38 extending about the entire periphery. In this way there will be a close fit at the transition between the mould 24 or 26 and the ring cavity 32. Various other arrangements are of course possible. The ridges could be located on the respective ends 18 and 20 but spaced from the mouth of the moulds, with a mating groove formed in the ring 14. The ridge could alternatively be formed on the ring 14, with notches in the moulds 24 and 26.

While not required, a further aspect of the present invention is that the ring 14 is also provided with a trough 40 extending about its entire periphery. The trough 16 is provided to catch any extraneous food product which may be extruded through the gap between the central aperture 35 and the plunger 16. This will prevent this extraneous food product from soiling the counter top or workspace. The trough is formed by a peripheral flange extending outward from the exterior of the ring cavity 32 and having an outer portion extending upward to a raised ring edge 42. This ring edge 42 further makes a convenient edge for manually grasping the ring 14 for placement on or removal from the base 12 with minimal soiling of the users hands.

In a preferred aspect of the invention, the entire ring 14, or at least the portion comprising ring cavity 32 may be either transparent, partially transparent of translucent so that the user operating the apparatus can view through the ring 14 to some degree. This is so that during the filling operation, described later below, the user can visually identify when the overall complete mould is full of food.

It can also be seen from the figures that the central aperture 35 is preferably (but not necessarily) surrounded by a sleeve 44 which is upstanding from the aperture when the device is in use i.e. when the ring 14 is placed on top of the base 12 as depicted. The central aperture 35, and thus the sleeve 44, may take a variety of shapes to mate with the plunger 16, but circular is preferred. With circular, the plunger 16 may be rotated manually within the central aperture 35. This rotation may help to dislodge the food from the plunger 16 to provide a better formed food product.

The apparatus also comprises the plunger 16 which is dimensioned and configured to pass through the central aperture 35 and sleeve 44. In particular the plunger 16 is elongated and includes a forming end 46 and at the opposite end a closing end 48. Between these ends 46 and 48 there is at least one outwardly extending plunger flange 50. The plunger flange(s) 50 is of a size greater than the central aperture 35. The purpose of the plunger flange 50 is to limit the insertion depth of the plunger within the forming space 34. During use both the forming end 46 and, upon inversion of plunger 16, the closing end 48 will likely be inserted into the central aperture 35 to form the food product. In both cases, the depth of insertion needs to be limited. In the embodiment shown, the plunger 16 is of a length, and the plunger flange 50 so placed longitudinally, so as to properly limit this insertion for both ends 46 and 48. Alternatively, the plunger 16 could be made longer, and there could be two separate plunger flanges 50 spaced from each other to each act independently to limit insertion. As is apparent, the forming end 46 preferably has a concave, rounded shape, while the forming end has a flat or even slightly convex shape. These are known in the art to properly form the food product.

A further inventive aspect of the present apparatus 10 is that the plunger 16 is provided with a diverter flange 52 extending from the plunger 16. Where a single plunger flange 50 is employed, the diverter flange 52 shall be an extension of the plunger flange 50, as shown. If two separate plunger flanges 50 are employed, then the diverter flange 52 would be located intermediate the plunger flanges 50.

The diverter flange 52 may extend normal to the axis of plunger 16 (not shown), but it is preferred that it be curved toward the forming end 46 as shown to end at a free edge 54. As illustrated in FIGS. 3 and 4 the diverter flange 52 is of a length and peripheral extent such that the free edge 54 is received within but spaced from the ring trough 40 when the plunger flange 50 abuts the sleeve 44 as the forming end 46 is received fully within the forming space 34. As noted previously, during use food may be extruded between the central aperture 35 and forming end 46, and this diverter flange 52 will ensure that any such extruded food is directed toward and into the trough 40. When the plunger is inverted such that closing end 48 is inserted into the central aperture 35, any food on the interior of the diverter flange 52 will remain therein due to its cup shape, while the free edge 54 provides a clean surface to manually grasp. This is much preferred compared to grasping those portions of the plunger 16 which have already been in contact with the food. Further, the apparatus 10 may be stored in the configuration of FIG. 2 with the diverter flange 52 providing a shield against ingress of contaminant to the uppermost mould 24 or 26, as well as providing a pleasing appearance.

Use of the apparatus 10 shape be described mainly with reference to FIGS. 5a-e. Starting from the storage condition of FIG. 2, the user will first remove the plunger 16 and ring 14 from the base 12. The user will then decide which of the two different moulds 24 or 26 shall be used and will place that mold uppermost. In FIG. 5 the mould 24 is uppermost and in use. The user will then insert the first food 56 (rice, ground meat, etc.) into the mould. The interior of the moulds 24 and 26 may include fill lines to assist in this.

The user will next assemble the ring 14 to the base 12. While holding the ring 14 in position the user will then insert the forming end 46 of plunger 14 into the central aperture 35 (FIG. 5b) and press the plunger downwardly until the plunger flange 50 engages and stops further insertion.

Movement of the forming end 46 axially downward into the chosen mould 24 or 26 serves to compress the first food 56 contained in the mould 6 and also to create an indentation therein. As this occurs, the volume of food 56 is not reduced, and as such the first food 46 flows upwardly about the forming end 46 to enter the ring cavity 32 and preferably to fill the entire forming space 34, minus that volume occupied by forming end 46. A certain amount of pressure is created in the first food as this occurs which is the reason for the user to manually hold the ring in place to prevent the first food 56 from dislodging the ring as it fills ring cavity 32. This could also be accomplished by an attachment mechanism between the ring 14 and base 12 such as bayonet, screw threads, or the like. It is preferred to fill the entirety of the forming space (minus forming end 46) with the first food 56, but this is difficult to determine. It is for this reason that the ring 14 (or at least that portion forming the ring cavity 32 be formed of a transparent or translucent material such that the user may visually determine the forming space 34 is filled in this step.

Figure 5B:
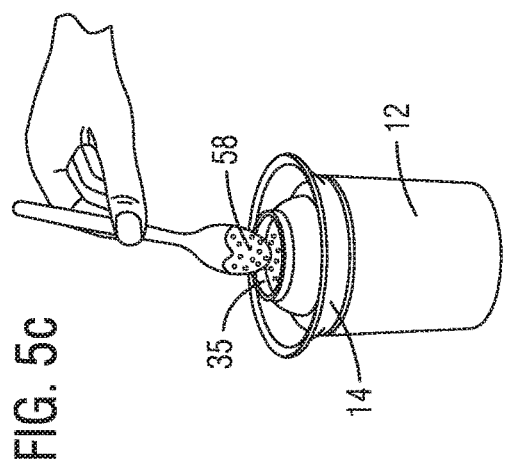
FIGS. 5 *a-e* are partial isometric illustrations of use of the apparatus
Figure 5C:
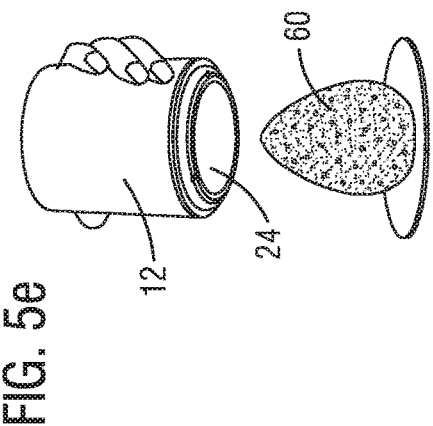
Figure 5A:
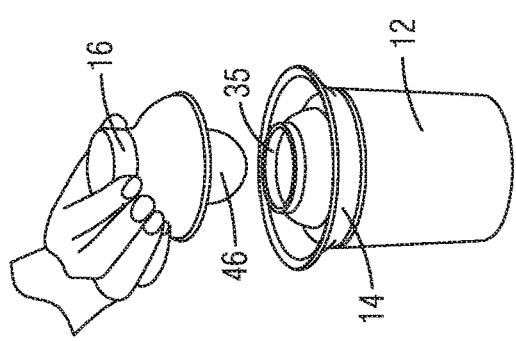
Figure 5D:
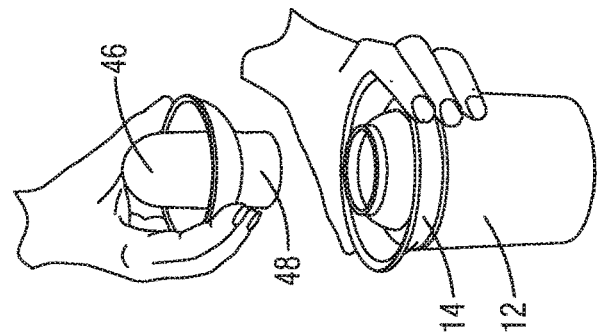
Figure 5E:
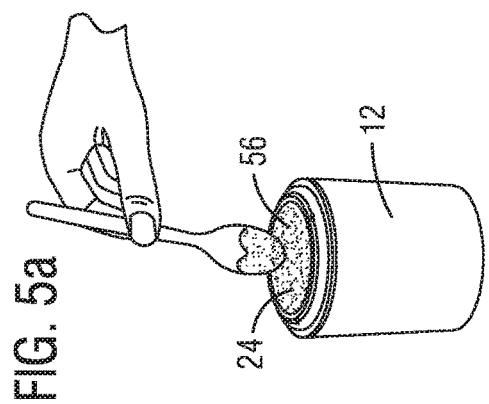

The user will then withdraw the plunger from the base 12 and ring 14, which should leave a cavity within the first food 56 in the shape of the forming end 46. With the ring 14 remaining in place, the user will next insert a second food 58 through the central aperture 35 to partially fill the cavity in the first food 54. This is shown in FIG. 5c. The user will then invert the plunger 16 and insert the closing end 48 into the central aperture 35, as shown in FIG. 5d. The closing end will press upon the first food 54 to cause it to flow over the second food 56, and encapsulate the second food 56 within the first food 54.

In this regard, it is noted that the forming end 46 may be and preferably is of a smaller size (such as diameter) than the closing end 48. In this manner the closing end 48 will engage better with uppermost portion of the first food and extend mainly if not totally outside the periphery of the cavity in the first food 56 formed by forming end 46. This is preferred to ensure the second food is fully encapsulated. It is also possible to add a further step of inserting additional first food 56 through central aperture 35 prior to inserting the closing end 48.

The user will then remove the plunger 16 from the ring 12, and remove the ring 14 from the base 12. The user will then invert the base, causing the completed food product 60 to fall out of the base. The food product 60 may then be eaten, or is ready for further preparation such as cooking.

From the foregoing it will be seen that this invention is one well adapted to attain all ends and objects set forth above together with the other advantages which are inherent within its structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth of shown in the accompanying drawings is to be interpreted as illustrative, and not in a limiting sense.

What is claimed is:

1. An apparatus for preparing a moulded food product, comprising:
   a base having first and second ends, and at least one sidewall extending therebetween, said first end having a first mould therein and said second end having a second mould therein, said first and second moulds being different in at least one aspect taken from the group of geometric shape and volume;
   a ring having a central aperture therethrough, the ring being selectively engageable with either said first or said second end of said base, the ring defining a ring cavity which when mated to one of said first or second molds defines a forming space; and
   a plunger which is dimensioned and configured to pass through said central aperture.

2. An apparatus as in claim 1, wherein said first and second ends have differing perimeters such that said at least one sidewall is tapered and provides a visual indication of whether the first or the second end is uppermost.

3. An apparatus as in claim 2, one of the first and second moulds is substantially round in cross-section and the other one of the first and second moulds is substantially a rounded cone or bullet shape.

4. An apparatus as in claim 1, wherein said ring includes a peripherally extending trough.

5. An apparatus as in claim 4, wherein said ring is sufficiently transparent to view food within said forming space to ascertain said forming space has been filled.

6. An apparatus as in claim 1, wherein said ring is sufficiently transparent to view food within said forming space to ascertain said forming space has been filled.

7. An apparatus as in claim 1, wherein said plunger further comprises a diverter flange extending peripherally outward and downward when said forming end is placed within said central aperture.

* * * * *